United States Patent
Yae et al.

(10) Patent No.: US 9,525,963 B2
(45) Date of Patent: Dec. 20, 2016

(54) METHOD FOR CONTROLLING A BLUETOOTH CONNECTION

(71) Applicants: Hyundai Motor Company, Seoul (KR); Kia Motors Corporation, Seoul (KR); Hyundai Mobis Co., Ltd., Seoul (KR)

(72) Inventors: Seong Soo Yae, Gyeonggi-do (KR); Ji Un Kim, Seoul (KR)

(73) Assignees: Hyundai Motor Company, Seoul (KR); Kia Motors Corporation, Seoul (KR); Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 15/067,781

(22) Filed: Mar. 11, 2016

(65) Prior Publication Data

US 2016/0198291 A1  Jul. 7, 2016

Related U.S. Application Data

(63) Continuation-in-part of application No. 14/507,000, filed on Oct. 6, 2014.

(30) Foreign Application Priority Data

May 9, 2014  (KR) .......................... 10-2014-0055641

(51) Int. Cl.
  *H04B 7/00*  (2006.01)
  *H04W 4/00*  (2009.01)
  (Continued)

(52) U.S. Cl.
  CPC .......... *H04W 4/008* (2013.01); *H04L 65/4069* (2013.01); *H04L 67/303* (2013.01);
  (Continued)

(58) Field of Classification Search
  USPC ........................ 455/41.1, 41.2, 41.3, 434, 16
  See application file for complete search history.

(56) References Cited

U.S. PATENT DOCUMENTS

2004/0264387 A1  12/2004 Gibeau
2009/0124281 A1*  5/2009 Takamune .......... H04M 1/6066
  455/550.1
(Continued)

FOREIGN PATENT DOCUMENTS

KR  10-2008-0013434  2/2008
KR  10-2008-0114753  12/2008
(Continued)

*Primary Examiner* — Ganiyu A Hanidu
(74) *Attorney, Agent, or Firm* — Mintz Levin Cohn Ferris Glovsky and Popeo, P.C.; Peter F. Corless

(57) ABSTRACT

A method for controlling a Bluetooth connection according an embodiment of the present disclosure includes requesting a confirmation of connectable profiles from a vehicle to a terminal, and responding to the connectable profiles in response to the confirmation request, requesting a first connection of the connectable profiles, determining whether a hands-free profile of the connected profiles is connected based on the connection request, and requesting a second connection of the hands-free profile of the connectable profiles prior to other profiles of the connectable profiles which are not connected, when it is determined that the connection of the hands-free profile is failed.

1 Claim, 3 Drawing Sheets

(51) Int. Cl.
      *H04W 76/02*        (2009.01)
      *H04M 1/60*         (2006.01)
      *H04L 29/06*        (2006.01)
      *H04L 29/08*        (2006.01)

(52) U.S. Cl.
      CPC ......... *H04M 1/6091* (2013.01); *H04W 76/02* (2013.01); *H04W 76/021* (2013.01); *H04W 76/028* (2013.01)

(56) References Cited

U.S. PATENT DOCUMENTS

| | | | | |
|---|---|---|---|---|
| 2010/0023204 | A1* | 1/2010 | Basir | G06F 1/3203 |
| | | | | 701/31.4 |
| 2011/0039556 | A1* | 2/2011 | Yi | H04W 48/16 |
| | | | | 455/434 |
| 2012/0309315 | A1* | 12/2012 | Sakata | H04M 1/6091 |
| | | | | 455/41.2 |
| 2012/0329445 | A1* | 12/2012 | Elliott | H04W 4/008 |
| | | | | 455/420 |
| 2014/0221033 | A1* | 8/2014 | Xia | H04R 27/00 |
| | | | | 455/515 |

FOREIGN PATENT DOCUMENTS

| | | |
|---|---|---|
| KR | 10-2009-0058618 | 6/2009 |
| KR | 10-2009-0098113 | 9/2009 |
| KR | 10-2011-0035565 A | 4/2011 |
| KR | 10-2011-0052310 A | 5/2011 |
| KR | 10-2012-0017683 | 2/2012 |
| KR | 10-2012-0047450 | 5/2012 |
| KR | 10-2013-0019916 | 2/2013 |

\* cited by examiner

METHOD FOR CONTROLLING A BLUETOOTH CONNECTION

CROSS-REFERENCE TO RELATED APPLICATION

This application is a divisional application of U.S. application Ser. No. 14/507,000, filed Oct. 6, 2014 which is based on and claims prioity from Korean Patent Application No. 10-2014-0055641, filed on May 9, 2014 in the Korean Intellectual Property Office, the disclosure of which is incorporated herein in its entirety by reference.

BACKGROUND

Technical Field

The present disclosure relates to a method for controlling a Bluetooth connection, and more particularly, a method for controlling a Bluetooth connection, which enhances the connectivity of a hands-free profile, increases the number of profile connection requests, and activates a Bluetooth streaming mode after an Advanced Audio Distribution Profile (A2DP) and an Audio/Video Remote Control Profile (AVRCP) are connected.

Description of the Related Art

It is well known that a phone call while driving may decentralize the driver's attention. In order to prevent this, hands-free phone call methodologies have been widely used for enabling the driver to concentrate on driving without the use of hands.

An example early hands-free device included a wired device mounted on a mobile phone holder. But in recent years, Bluetooth technology has been applied to such devices, and thus phone calls are now possible even while leaving the mobile phone in a bag or pocket, for example.

Bluetooth is a short-range wireless communication technology derived from a specification of the IEEE 802.15.1, and it allows electronic devices, such as wireless terminals (e.g. a computer, a cell phone, a headset, a PDA, a printer, a mouse, a keyboard and the like)located within about 10 m to wirelessly communicate with each other in a low cost and low power manner.

Existing Bluetooth hands-free techniques output an audio signal transmitted from a paired mobile phone or MP3 player through the speaker provided in a vehicle and transmit the user's voice signal inputted through a microphone provided in a vehicle to the mobile phone when a call function of the mobile phone is used. The conventional Bluetooth specification was defined so that it connects when a request for connection is received and disconnects when a request for releasing the connection is received. On the basis of this specification, if Bluetooth connectivity is disconnected due to an error of one of devices, a problem may occur where the Bluetooth connectivity cannot be reconnected. In cases of Bluetooth technology being integrated in a vehicle, such a problem where Bluetooth becomes disconnected and not reconnected frequently arises, causing customer dissatisfaction.

SUMMARY

An object of the present disclosure is to provide a method for controlling a Bluetooth connection, which decreases the failure of such connections, and hands-free techniques can attempt to reconnect upon disconnection to enhance Bluetooth connectivity.

The method for controlling a Bluetooth connection according to an embodiment of the present disclosure comprises steps of requesting a confirmation of connectable profiles from a vehicle to a terminal, and responding to the connectable profiles in response to the confirmation request; requesting a first connection of the connectable profiles; determining whether a hands-free profile of the connected profiles is connected based on the connection request; and requesting a second connection of the hands-free profile of the connectable profiles prior to other profiles of the connectable profiles which are not connected, when it is determined that the connection of the hands-free profile is failed.

In an embodiment, the steps of requesting a connection of the hands-free profile and requesting all of the connectable profiles further comprises continually attempting the connection request of the hands-free profile and the connectable profiles up to 3 times, respectively, and when the connection of the each profile is failed, the connection of another profile is attempted.

A method for controlling a Bluetooth connection according to an embodiment of the present disclosure comprises steps of requesting a connection of an Advanced Audio Distribution Profile (A2DP) from a vehicle to a terminal; requesting a connection of an Audio/Video Remote Control Profile (AVRCP) from the vehicle to the terminal; determining whether the A2DP and the AVRCP are connected; entering a Bluetooth streaming mode between the vehicle and the terminal while a menu controlling a streaming is not displayed, when only the A2DP is connected based on the determination; and entering a Bluetooth streaming mode between the vehicle and the terminal while a menu controlling a streaming is displayed, when both of the A2DP and AVRCP are connected based on the determination.

In an embodiment, the menu controlling a streaming includes a play button that plays audio or video played in the Bluetooth streaming mode, a pause button that stops the play, and an area in which information for the audio and the video is displayed.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
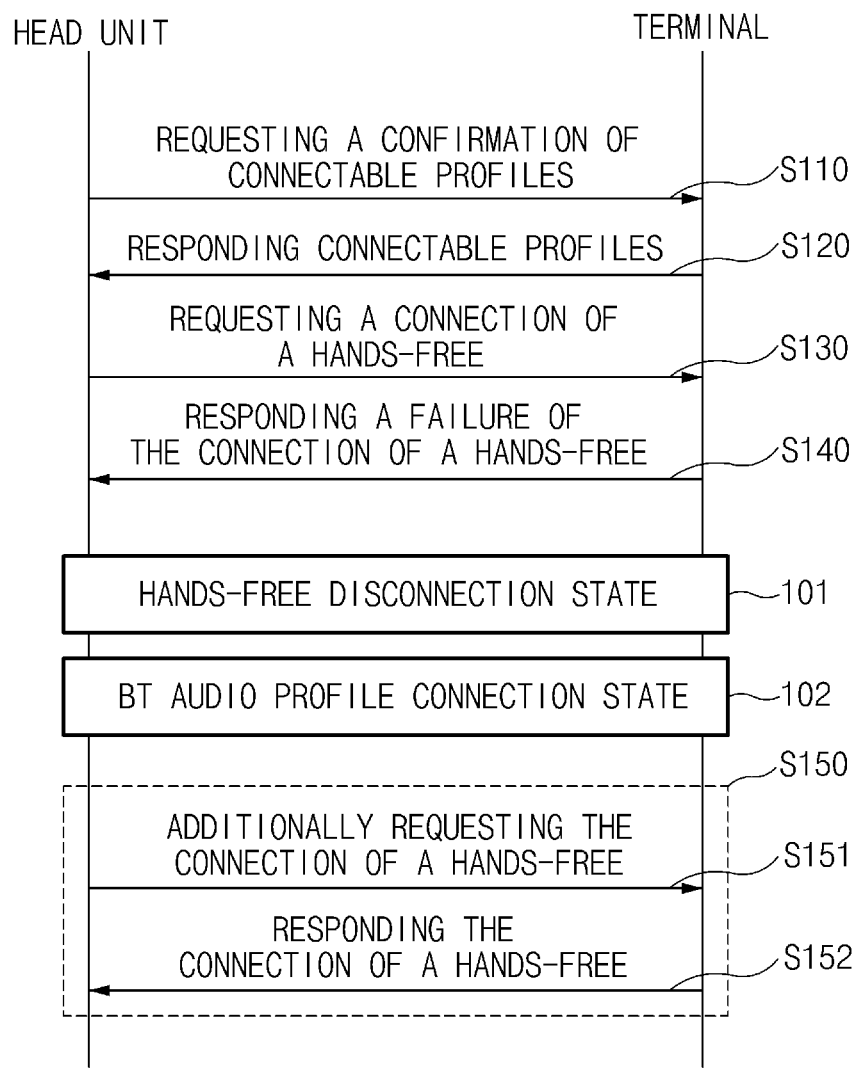
FIG. 1 is a diagram showing the process of enhancing the connectivity of a hands-free profile in a method for controlling a Bluetooth connection according to an embodiment of the present disclosure.

The advantage and features of the embodiments disclosed herein and how to achieve the same will be explained through embodiments described in detail with the accompanying drawings. However, the disclosure is not limited to embodiments described herein and may be embodied in other aspects. Rather, the embodiments are provided for explaining to those skilled in the art to which this disclosure pertains to readily embody the technical spirit of the present disclosure.

In the drawings, embodiments of the present disclosure are not limited to the shown specific aspects and are exaggerated in order to clarify. Although specific terms are used herein, it is only used for explaining the disclosed embodiments, and it is not used for limiting the meaning or the scope of the embodiments described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods for controlling a Bluetooth connection may be executed by at least one controller. The term "controller" refers to a hardware device that includes a memory and a processor. The memory is configured to store program instructions, and the processor is configured to execute the program instructions to perform one or more processes which are described further below.

Wireless communication, especially a Bluetooth connection, between a vehicle and a terminal can be frequently disconnected. The operation of the connection and disconnection can be intentionally performed by the user, but, regardless of the user's intention, if the Bluetooth connection is disconnected and the control or use of the terminal is limited due to the limitation of wireless communication, or communication problems occur between the vehicle and the terminal, it can cause inconvenience to the user of the vehicle, and it is recognized as a breakdown of the terminal or the communication module of the vehicle. As a result, such situation causes customer dissatisfaction.

In particular, the current Bluetooth specification was defined to connect a corresponding profile when receiving a request for connecting the profile and to disconnect a corresponding profile when receiving a request for disconnecting the profile. On the basis of this specification, if two types of devices to be connected (for example, a head unit and a terminal) simultaneously request a connection to the same profile, the two requests collide with each other and the connection for the corresponding profile fails. Also, problems resulting from the connection request and response delay due to the load of the terminal itself, not a vehicle, as well as problems resulting from temporary connection failure due to software problems on the mobile phone itself frequently occur. Due to these obstacles for a profile connection, the user of the vehicle may inconveniently be precluded from using a specific service (for example, hands-free, streaming, streaming control or phone book, etc.).

The present disclosure is directed to eliminating the above inconvenience of the user, where disconnection or connection failure of a profile may occur, through a series of connection managing processes such as the connection and connection management of a Bluetooth profile for a vehicle. Hereinafter, it is understood that the vehicles referenced below include a Bluetooth communication module for connecting with a terminal via Bluetooth.

FIG. 1 is a diagram showing the process of enhancing the connectivity of a hands-free profile in a method for controlling a Bluetooth connection according to an embodiment of the present disclosure.

First, when a user enters a vehicle, and the user has a terminal, the vehicle can request a confirmation of a profile which can be connected (i.e., "connectable profile") (S110). Then, in response to the request of step S110, the terminal answers the profile by sending a message (e.g., data signal) via Bluetooth from the current terminal to the vehicle (S120).

Then, the vehicle requests connection to one or more connectable profiles according to the response received from the terminal. Specifically, it requests the connection to a hands-free profile of the connectable profiles (S130), and requests connection to the profiles other than the requested hands-free profile. The order of connection requests of the hands-free profile and the other connectable profiles can be changed.

After the connection request to the profiles included in the response in step S120 is completed, it can be determined whether the hands-free profile is connected. As the result of the determination, if the hands-free profile is not connected (S140), the hands-free profile between the vehicle and the terminal is not connected, and thus the user of the vehicle cannot use the hands-free function. For example, the hands-free profile may be not connected (101), and the Bluetooth audio profile between the vehicle and the terminal may be connected (102).

Specifically describing this case (101, 102), if the user of the vehicle enters the vehicle in a state which the Bluetooth function is not activated for saving the battery of the terminal, starts the ignition, and then activates the Bluetooth function, the Bluetooth audio profile may be firstly connected while the hands-free profile is not connected, between the timing of the vehicle's start up and the timing of the Bluetooth activation. Also, when the user enters the vehicle, even if the user possesses the terminal, the Bluetooth audio profile may similarly be firstly connected. Eventually, in this case, the hands-free profile is not connected between the vehicle and the terminal, and thus the user of the vehicle can't use the hands-free function.

In existing techniques for managing a Bluetooth connection between a vehicle and a terminal, if there is no separate operation by the user of the vehicle, the state in which the hands-free profile is disconnected (101) is continually maintained. However, in the method for controlling a Bluetooth connection according to the present disclosure, since the basic purpose of the Bluetooth connection is a hands-free connection between the vehicle and the terminal, it may be determined (e.g., by a controller, as described above) whether the hands-free profile is connected. As a result, if the connection of the hands-free profile requested in step 130 is failed, the connection of the hands-free profile is requested again (S150). As a result, if the hands-free profile is not connected between the timing of the vehicle's start up and the timing of the Bluetooth activation, the hands-free profile can be automatically connected without any user operation (S152).

Figure 2:
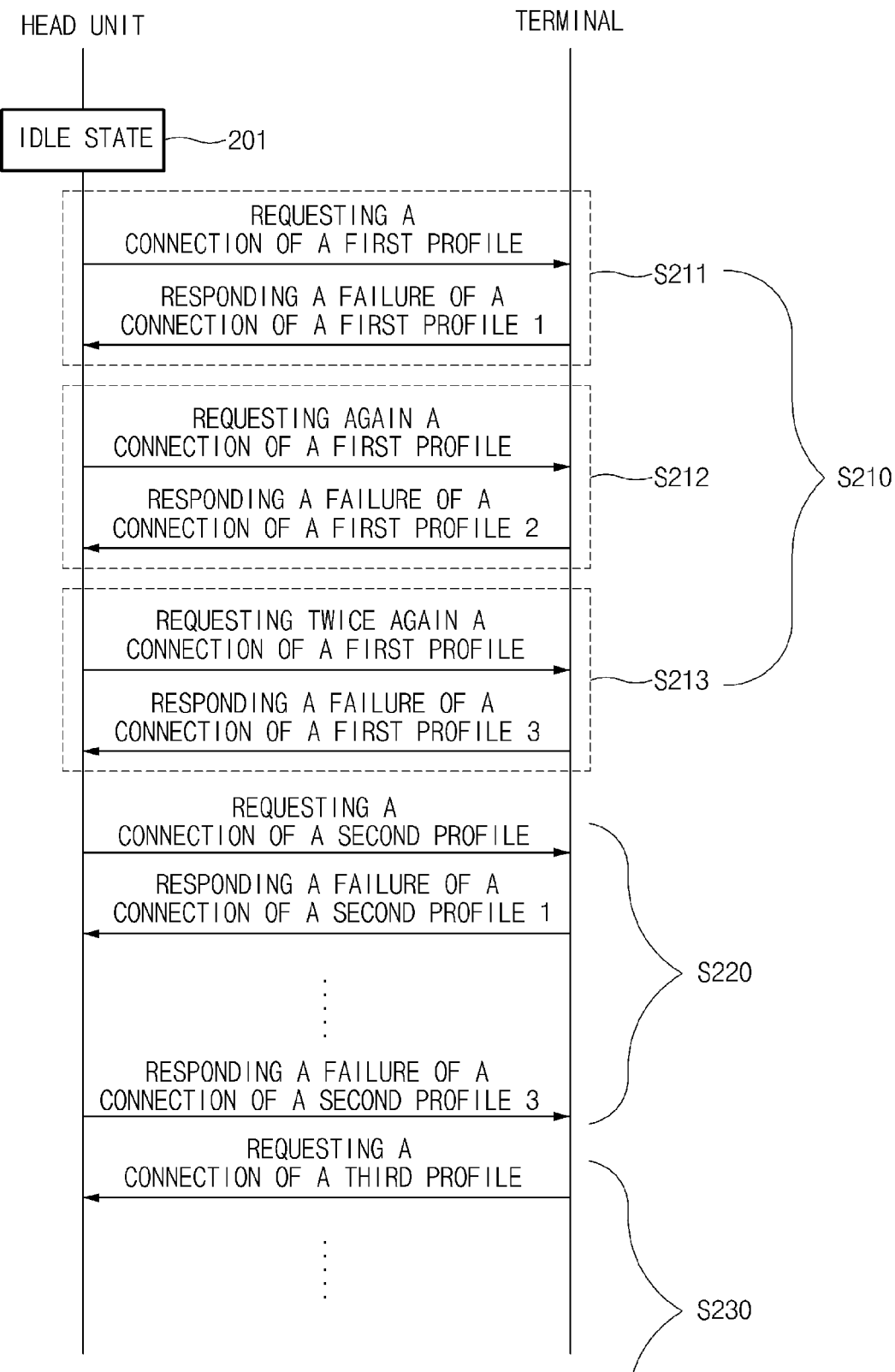
FIG. 2 is a diagram showing the process of enhancing the connectivity of a Bluetooth connection by increasing the number of connection requests in a method for controlling a Bluetooth connection according to an embodiment of the present disclosure.

FIG. 2 is a diagram showing the process of enhancing the connectivity of a Bluetooth connection by increasing the number of connection requests in a method for controlling a Bluetooth connection according to an embodiment of the present disclosure.

In the step of requesting the hands-free profile and the connectable profile as described in FIG. 1, if the response and the processing speed are slowed due to connection failures and increases of the load in the Bluetooth system of the terminal and the vehicle, respectively, the corresponding profile connection can be failed. In such case, in existing techniques for managing a Bluetooth connection between the vehicle and the terminal, if there is no separate operation of the user, the state in which the corresponding profile is disconnected (for example, idle state; 201) is continually maintained. However, in the method for controlling a Bluetooth connection according to the present disclosure, in response to the connection request of a profile not being completed due to an error, time-out, or the like, the connection request may be repeated for a maximum of 3 times for each of profiles (S211, S212, S213). After the repeated connection requests (S211, S212, S213), if the corresponding profile connection is not completed, the connection of another profile is attempted (S220 or S230). As a result, since the number of connection requests for each profile is increased, the connectivity of the profile can be enhanced.

Figure 3:
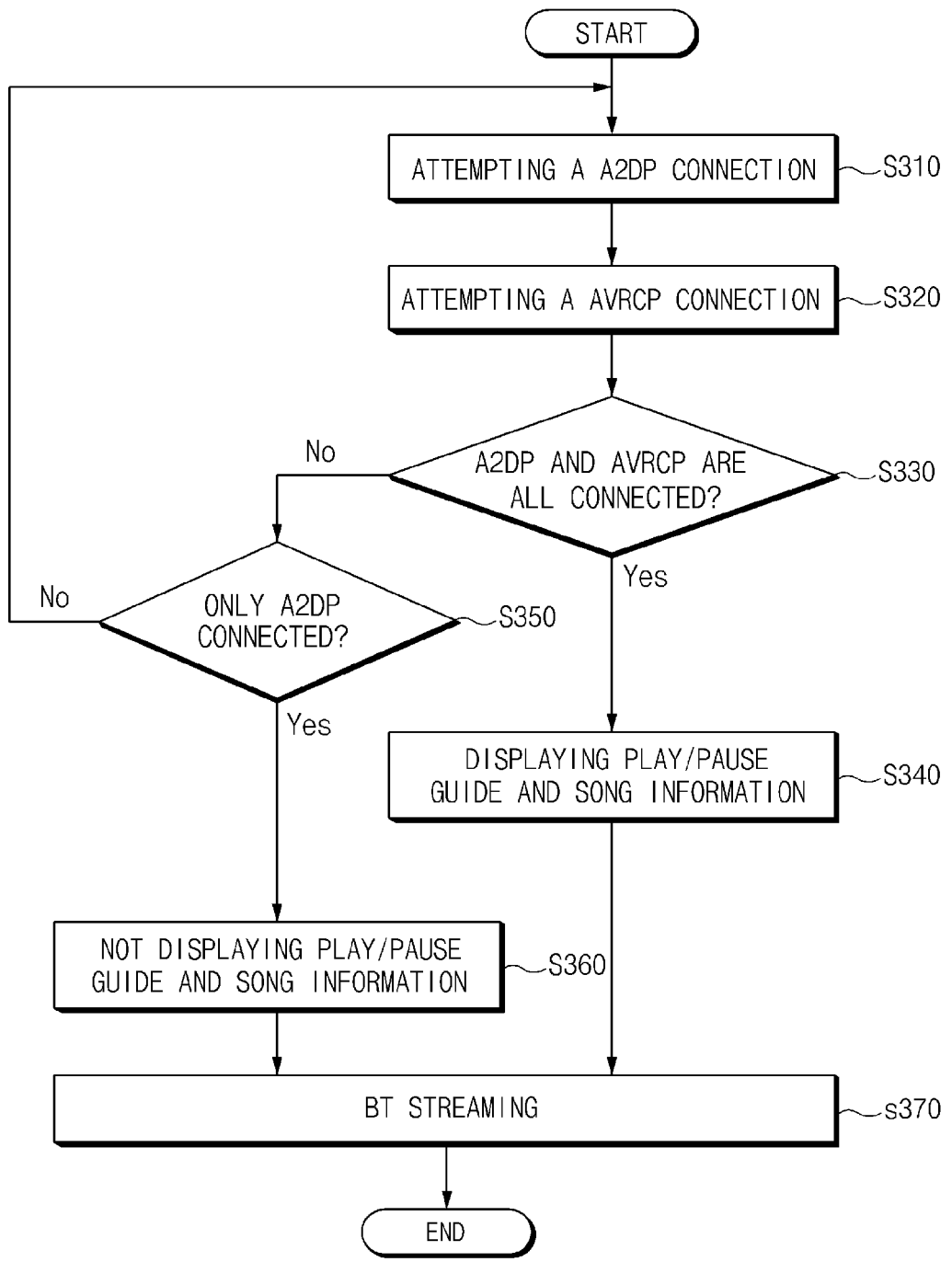
FIG. 3 is a diagram showing the process of activating a Bluetooth streaming mode after the A2DP and the AVRCP are connected in a method for controlling a Bluetooth connection according to an embodiment of the present disclosure.

FIG. 3 is a diagram showing the process of activating a Bluetooth streaming mode after the A2DP and the AVRCP are connected, thereby enabling multiple functions of Bluetooth streaming (e.g., play, control, etc.), in a method for controlling a Bluetooth connection according to an embodiment of the present disclosure.

In existing techniques for managing a connection of a Bluetooth streaming mode between the vehicle and the terminal, when entering into the streaming mode immediately after the connection of the Bluetooth A2DP is completed, because the title of the audio or video being played is not displayed, or the menu controlling the streaming is not displayed, it may cause inconvenience to the user. However, in the method for controlling a Bluetooth connection according to the present disclosure, when the completion of A2DP connection and AVRCP connection is confirmed, the system is allowed to enter the Bluetooth streaming mode.

To this end, firstly, the A2DP connection is requested from the vehicle to the terminal (S310), and then the AVRCP connection is requested from the vehicle to the terminal (S320). Then, it is determined whether both of the A2DP and AVRCP are connected (S330). Based on the result of determination in step S330, if only the A2DP is connected (S350), the menu controlling the streaming is not displayed, and it enters the Bluetooth streaming mode between the vehicle and the terminal (S360, S370). On the other hand, based on the result of determination in step S330, if the two profiles of A2DP and AVRCP are both connected, the menu controlling the streaming in the Bluetooth streaming mode is displayed, and it enters the Bluetooth streaming mode between the vehicle and the terminal (S340, S370). Here, the menu controlling the streaming can include a play button playing an audio and video in the Bluetooth streaming mode, and a pause button stopping a play, and in addition, can include a display area displaying information for the played audio or video. As a result, since the Bluetooth streaming mode is entered, thus enabling the Bluetooth streaming functions (e.g., play, pause, etc.), the user's operability and convenience can be improved.

In view of the above description, the method for controlling a Bluetooth connection according to an embodiment of the present disclosure can overcome indefinite wait times for a connection request of a corresponding profile, the occurrence of collision, and the profile connection problem due to, for example, the transmission and reception timing of the Bluetooth connection request/response of a profile. Specifically, inconvenience resulting from the Bluetooth service desired by a user (e.g., hands-free service, streaming service, and the like) being unavailable when only a part of the Bluetooth profiles in a vehicle is used, can be reduced.

In the above description, the disclosed embodiments have been described through specific examples, but it may be well understood that various modifications can be made without departing from the scope of the present disclosure. Therefore, the scope of the present disclosure is not limited to the above described embodiments, and it should be defined by the appended claims and their equivalents. When taking the foregoing description into account, if the modifications and variations of the embodiments fall within the following claims and their equivalents, then it is construed that the present disclosure includes these modifications and variations.

What is claimed is:

1. A method for controlling a Bluetooth connection comprising steps of:
   requesting a connection of an Advanced Audio Distribution Profile (A2DP) from a vehicle to a terminal;
   requesting a connection of an Audio/Video Remote Control Profile (AVRCP) from the vehicle to the terminal;
   determining whether the A2DP and the AVRCP are connected;
   entering a Bluetooth streaming mode between the vehicle and the terminal while a menu controlling a streaming is not displayed, when only the A2DP is connected based on the determination; and
   entering a Bluetooth streaming mode between the vehicle and the terminal while the menu controlling the streaming is displayed, when both of the A2DP and AVRCP are connected based on the determination,
   wherein the menu controlling the streaming includes a play button that plays audio or video played in the Bluetooth streaming mode, a pause button that stop the play of the audio or video, and an area in which information for the audio or video is displayed.

* * * * *